June 7, 1966  R. E. WATSON  3,254,363
TOILET SEAT HINGE POST UNIT
Filed Jan. 16, 1964
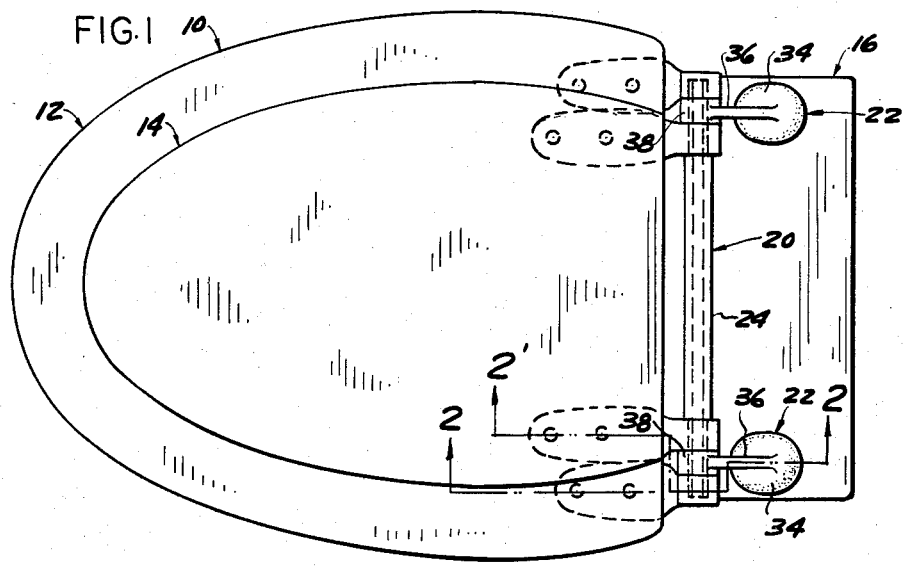
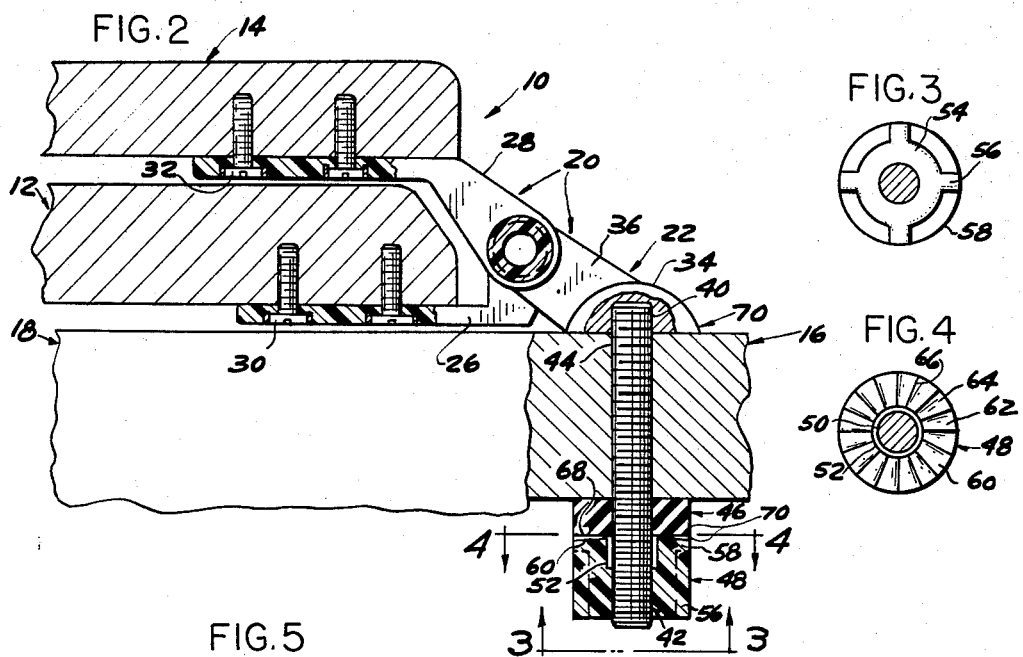
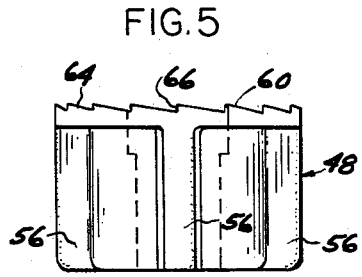
INVENTOR.
ROBERT E. WATSON
BY Barthel & Bugbee
ATTORNEYS.

United States Patent Office 3,254,363
Patented June 7, 1966

3,254,363
TOILET SEAT HINGE POST UNIT
Robert E. Watson, Farmington, Mich., assignor to Swedish Crucible Steel Company, Detroit, Mich., a corporation of Michigan
Filed Jan. 16, 1964, Ser. No. 338,133
2 Claims. (Cl. 16—128)

This invention relates to toilet seats, and, in particular, to toilet seat hinges.

Hitherto, toilet seat hinges have been largely made of metal, particularly the hinge posts, and provided with threaded shanks extending downward through the holes in the rearwardly-extending platform at the rear of the toilet bowl. Where the upper part of the hinge post has been made of synthetic plastic, its threaded shank has been embedded at its upper end in the plastic base of the hinge post. Whatever the construction of these prior hinge posts, the corrosive fumes and liquids encountered in the vicinity of such prior hinges have caused corrosion of the threaded portions thereof, together with the correspondingly-threaded bores of the nuts securing the hinge posts to the toilet bowl platform. The result has been that such corrosion has "frozen" the nuts upon the threaded shanks so that attempted removal has frequently caused breakage of the platform of the toilet bowl, together with the destruction of the hinge post itself. The present invention solves this problem by providing a nut and shank construction which enables the hinge posts to be removed regardless of the occurrence of such corrosion, as well as facilitating the correctly-aligned installation of the nut.

Accordingly, one object of this invention is to provide a toilet seat hinge post unit wherein the threaded shank of the hinge post and/or the threaded nut securing the shank to the toilet bowl are quickly and easily removed from the hinge post or separated from one another even when corrosion has occurred which would render conventional hinge posts unremovable.

Another object is to provide a toilet seat hinge post unit of the foregoing character wherein the threaded shank consists of a stud which is threaded at is upper end into the base of the hinge post, wherein its lower portion is threaded to receive a washer and nut securing it to the toilet bowl platform.

Another object is to provide a toilet seat hinge post unit of the foregoing character as set forth in the object immediately preceding, wherein the nut is preferably of plastic or other non-corrodable material and is provided with end projections or serrations which correspondingly indent the washer of resilient material associated therewith, thereby inhibiting accidental loosening which would allow the seat to move undesirably on the bolt.

Another object is to provide a toilet seat hinge post unit as set forth in the two objects preceding wherein the end serrations are radially-directed and inclined or ratchet-shaped with the radial ratchet teeth inclined rearwardly to the direction of rotation in threading the nut upon the shank so that the radial shoulders on the radial ratchet teeth are rearwardly-located so as to dig into the soft rubber-like washer and thereby form, in the washer, opposing shoulders at the edges of the indentations thus caused, with the result that accidental loosening of the nut is effectively prevented.

Another object is to provide a toilet seat hinge post unit of the foregoing character wherein the fluted or serrated upper end of the nut is provided with an enlarged smooth elongated bore which serves as a pilot portion smoothly receiving the lower end of the threaded shank before the latter commences to enter the reduced diameter bore which threadedly engages the threaded shank.

Other objects and advantages of the invention will become apparent during the course of the following description of the accompanying drawing, wherein:

FIGURE 1 is a top plan view of a toilet seat installation equipped with the hinge posts of the present invention;

FIGURE 2 is an enlarged central vertical section taken along the line 2—2—2′ in FIGURE 1 through the lower and upper hinge leaves and hinge post;

FIGURE 3 is a cross-section, with the nut in bottom plan view, taken along the line 3—3 in FIGURE 2;

FIGURE 4 is a cross-section, with the nut in top plan view, taken along the line 4—4 in FIGURE 2; and FIGURE 5 is a side elevation of the nut shown in FIGURES 3 and 4, on the enlarged scale.

Referring to the drawing in detail, FIGURE 1 shows a toilet seat installation, generally designated 10, including a conventional seat or ring 12 and cover or lid 14 pivotally mounted on the rearward or platform portion 16 of a toilet bowl 18 by means of a hinge unit 20. The hinge unit 20 in turn consists of a pair of spaced hinge posts 22 which pivotally support a hinge rod 24 upon which are pivotally mounted lower and upper hinge leaves 26 and 28 secured to their respective seat and lid 12 and 14 by fasteners 30 and 32 respectively. The present invention is concerned primarily with the hinge posts 22 and their associated parts securing them to the toilet bowl platform portion 16. Each hinge post 22 is preferably of synthetic plastic material and includes an enlarged convex or dome-shaped base portion 34 from which an arm 36 extends upward in a forwardly-inclined direction and terminates in a horizontally-bored enlargement or head 38 which receives the reduced diameter end portions of the hinge rod 24 which may be either solid or tubular, as shown in FIGURES 1 and 2.

Threaded into the socket 40 in each base portion 34 is the upper end portion of a threaded rod, preferably a stud 42. The stud 42 extends downwardly through an aligned hole 44 in the platform portion 16 of the toilet bowl 18 and passes through a resilient washer 46, preferably of soft rubber, into a nut 48 also preferably of synthetic plastic material. The nut 48 is provided with a threaded bore 50 terminating at its upper end in a smooth elongated enlarged counterbore 52 serving as a pilot portion to guidingly engage the stud 42 before it enters the threaded reduced diameter bore 50 so as to avoid tilting the nut 48 while starting to thread it on the stud 42. The nut 48 is thus rendered self-starting by being provided with a considerable amount of lead so that it cannot easily be stripped while threading it upon the stud 42.

The reduced-diameter cylindrical lower portion 54 of the nut 48 is provided on its sides with outwardly-projecting parallel axial ribs 56 (FIGURE 3) to prevent slippage when engaged by a wrench or the jaws of a pair of pliers or other tool used in threading the nut 48 upon its respective stud 42. The ribs 56 at their upper ends terminate in a radial flange 58 enlarging the upper end 60 of the nut 48 with respect to its reduced diameter lower portion 54. The upper end 60 of the nut 48 is provided with radial ratchet serrations 62 (FIGURE 4) having upwardly and rearwardly-inclined top surfaces 64 relatively to the direction of threading the nut 48 upon the stud 42. The inclined surfaces 64 terminate in rearwardly-disposed shoulders 66 adapted to dig into the lower end 68 of the soft rubber-like washer 46. The hinge post 22, stud 42, washer 46 and nut 48 collectively form a hinge post unit, generally designated 70.

In the installation of the hinge unit 20 provided with the hinge post units 70 of the present invention, let it be assumed that the upper end portions of the studs 42 have been threaded into their respective sockets 40 in the hinge posts 22 and that the studs 42 have been lowered through their respective holes 44 in the toilet bowl platform 16. The operator then installs the soft rubber-like washers 46 by pushing them upward upon the studs 42 until they engage the lower sides of the platform 16. The operator then pushes the nut 48 upward on the lower end of the stud 42, which first enters the smooth enlarged guide counterbore 52 to prevent undue tilting of the nut 48 while the threaded stud 42 is being threaded through the reduced diameter lower bore 50 in the nut 48. The operator then continues to screw the nut 48 upon the stud 42 until its upper end 60 engages the lower end 68 of the soft rubber-like washer 46, whereupon the radial ratchet teeth or flutes 64 indent the washer 46 with the rearward shoulders 66 of the ratchet teeth 64 forming corresponding abutment shoulders in the indentations of the washer 46. Meanwhile, the downward pull imparted to each stud 42 by tightening the nut 48 on the lower end thereof is transmitted therethrough to the threads on the upper end thereof within the socket 40, pulling the stud threads downward against the socket threads into tight locking engagement with one another. The indentations of the soft resilient washer 46 by the rearward shoulders 66 of the ratchet teeth 64 then firmly hold this locking engagement against undesired loosening. When, however, the operator rotates the nut 48 in the opposite direction to loosen it, the consequent release of pressure of the stud threads on the socket threads unlocks these threads and enables the stud 42 to be unscrewed from its respective socket 40 if the operator so desires.

What I claim is:

1. A toilet seat hinge post unit for mounting a toilet seat hinge assembly upon a toilet bowl, said hinge post unit comprising a hinge post of synthetic plastic material having at its lower end a base portion engageable with the toilet bowl and containing a threaded socket in the bottom thereof, a threaded rod having its upper end threadably engaging said base portion socket and extending downwardly therefrom, a washer of yielding elastic deformable material on said rod, and a nut of synthetic plastic material having a threaded bore threadedly engaging said rod and having an upper end with upwardly-extending radial projections thereon of wedge-shaped cross-section forming ratchet teeth engageable with said washer in indenting relationship therewith, said ratchet teeth having upper surfaces inclined upwardly and rearwardly relatively to the threading-on direction of said nut end and terminating in rearwardly-disposed washer-indenting shoulders.

2. A toilet seat hinge post unit, according to claim 1, wherein said nut has an enlarged elongated pilot counterbore above said threaded bore and extending downwardly from said upper end of said nut to said threaded bore.

References Cited by the Examiner

UNITED STATES PATENTS

| | | | |
|---|---|---|---|
| 246,393 | 8/1881 | Imperatori et al. | 151—39 |
| 1,249,336 | 12/1917 | Cook | 151—40 |
| 3,000,066 | 9/1961 | Cochran. | |
| 3,046,570 | 7/1962 | Young | 4—240 |
| 3,080,572 | 3/1963 | Miller et al. | 4—240 |

FOREIGN PATENTS

| | | |
|---|---|---|
| 558,852 | 6/1958 | Canada. |
| 1,263,970 | 5/1961 | France. |
| 151,919 | 4/1932 | Switzerland. |

JOSEPH D. SEERS, *Primary Examiner.*

DONLEY J. STOCKING, *Examiner.*

D. GRIFFIN, *Assistant Examiner.*